United States Patent Office 3,679,670
Patented July 25, 1972

3,679,670
ARSENIC CONTAINING BISAZIDE COMPOUNDS
Nicholas J. Clecak, San Jose, and Robert J. Cox, Los Gatos, Calif., assignors to International Business Machines Corporation, Armonk, N.Y.
No Drawing. Filed Nov. 26, 1971, Ser. No. 202,574
Int. Cl. C07c *117/00*
U.S. Cl. 260—240 G                             3 Claims

ABSTRACT OF THE DISCLOSURE

The novel compounds bis-(p-azidophenyl) arsenic acid and p-arseno (p-azidobenzylidene) aniline have been prepared and found useful as negative photoresists which leave metallic arsenic deposited on the substrate after development.

FIELD OF THE INVENTION

This invention is concerned with certain novel chemical compounds which contain arsenic and which are bisazides. They are useful as photoresists and have the additional advantage of leaving a metallic deposit after development.

PRIOR ART

Bisazides have been used as photoresists in the past, for example, in U.S. Pat. 2,940,853 which discloses the use of 2,6 - bis(p - azidobenzylidene)-4-methylcyclohexanone. The prior art materials, however, do not leave a metallic deposit on the substrate after development.

SUMMARY OF THE INVENTION

Negative photoresist materials used in the fabrication of microelectronics consist for the most part of bisazides which, when struck by actinic light decompose to active intermediates, possibly nitrenes, which then crosslink and insolubilize a polymer containing more unsaturated sites. Polymers such as partially cyclized polyisoprene are normally used for this purpose. The non-light struck areas are then washed away with a solvent such as xylene leaving behind the insoluble crosslinked polymer. Subsequent treatment includes the deposition of metals normally used in the manufacture of micro-electronic devices. Arsenic is one of the metals used in the process.

We have now prepared a new class of bisazides which contain arsenic, are highly colored, and are very readliy decomposed by light to reactive intermediates which can crosslink and insolubilize polymers containing unsaturated sites. The arsenic left behind after the development of such a system may be utilized as an integral part of the microelectronics, without the need for a separate step to deposit the metal.

While the invention has been particularly shown and described with reference to preferred embodiments thereof, it will be understood by those skilled in the art that various changes in the form and details may be made therein without departing from the spirit and scope of the invention.

EXAMPLE I (Bis-(p-azidophenyl) arsenic acid)

Bis-(p-nitrophenyl) arsenic acid prepared from p-nitrophenyl dichloro-arsine and p-nitroaniline (Chemical Abstracts 49 14664 (1955) was reduced in 250 ml. of glacial acetic acid under 50 lbs. of hydrogen in a Parr hydrogenator apparatus using a palladium in charcoal catalyst. The amine was treated with concentrated hydrochloric acid and the acetic acid removed under a vacuum. This solution of amine hydrochloride was diluted with water and treated at 20–25° C. with 5 N sodium nitrite until a positive test for nitrite was indicated. This solution of diazonium salt reacted at room temperature with aqueous sodium azide and the resultant precipitate of bis-(p-azidophenyl) arsenic acid filtered. It was washed with water, dissolved in hot dioxane, treated with charcoal and reprecipitated with petroleum ether. The azide decomposed on heating to 176° C. and was obtained in 30% yield from the nitro precursor. The combustion analysis is shown below.

Calcd. for $C_{12}H_9AsN_6O_2$ (percent): C, 41.87; H, 2.63; N, 24.41; As, 21.76. Found (percent): C, 42.39; H, 2.86; N, 23.89; As, 21.46.

EXAMPLE II p-Arseno (p-azidobenzylidene) aniline p-Arsenoaniline was prepared from p-arsenilic acid by reduction with zinc and hydrochloric acid. This amine was heated on a steam bath with an excess of p-azidobenzaldehyde in dimethylformamide. After 1 hour the mixture was filtered and the dimethylformamide reduced to ½ volume under reduced pressure (not heat). The yellow azide precipitated out of the solution was filtered, washed with ether and dried. Combustion analysis was as follows:

Calcd. for $C_{26}H_{18}N_8As_2$ (percent): C, 52.72; H, 3.06; N, 18.91. Found (percent): C, 52.95; H, 3.28; N, 18.78.

EXAMPLE III

A typical formulation for a negative photoresist using one of these compounds:

20 g. of cyclized polyisoprene
1.5 g. of the azide in Example II dissolved in 100 ml. percent of xylene This solution is coated on a suitable substrate and exposed through a pattern by means of a mercury arc lamp. The substrate was then developed by washing with xylene.

What is claimed is:
1. A compound selected from the group consisting of p-arseno (p-azidobenzylidene) aniline and bis-(p-azidophenyl) arsenic acid.
2. A compound as claimed in claim 1, namely, p-arseno (p-azidobenzylidene) aniline.
3. A compound as claimed in claim 1, namely, bis-(p-azidophenyl) arsenic acid.

References Cited
UNITED STATES PATENTS
3,558,609   1/1971   Ruckert _____ 260—240

JOHN M. FORD, Primary Examiner

U.S. Cl. X.R.
260—349